Aug. 13, 1935.  F. L. SCOTT  2,011,084
MOUNTING FOR DRILL CUTTERS
Filed June 20, 1932
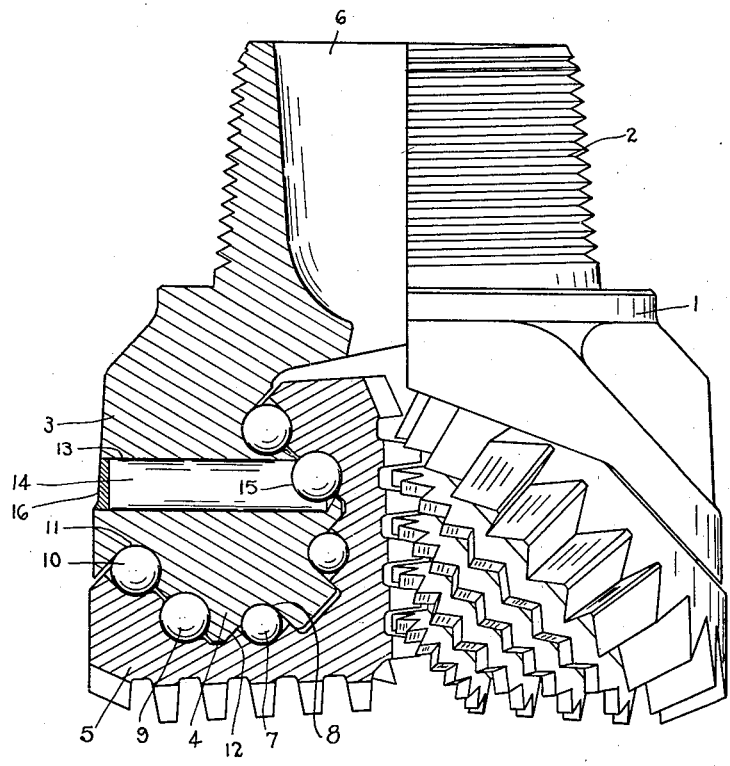
F. L. SCOTT   INVENTOR
BY *Jesse R. Stone*
ATTORNEY Patented Aug. 13, 1935

2,011,084

UNITED STATES PATENT OFFICE 2,011,084

MOUNTING FOR DRILL CUTTERS

Floyd L. Scott, Houston, Tex., assignor to Hughes Tool Company, Houston, Tex., a corporation of Texas Application June 20, 1932, Serial No. 618,189

8 Claims. (Cl. 255—71)

My invention relates to roller drill cutters and particularly the conical shaped cutters which when mounted on a drill head are fitted about the ends of the shafts of the well drill and enclose the ends of the shafts.

It has been, until very recently, the custom to mount cone shaped cutters upon bushings fixed upon the supporting shafts of the bit head and to furnish means to lubricate said cutters and bushings during operation. The attachment and filling of the lubricator is a disagreeable time-consuming job which makes the use of the luricator undesirable and also expensive. Furthermore the cutters may fail to rotate if the lubricant fails to circulate or is exhausted and the cutters will stick and fail to rotate.

I desire to do away with the necessity for lubrication in cutters of this character by allowing for the circulation of flushing fluid about the bearings.

I have as a further object to provide means to take up all the thrust of the cutter upon the shaft, said means including rolling bearings which space the cutters from the shafts, and to employ said bearing to retain the cutter upon the shaft.

I desire to so position and form said bearings that the shaft and cutters will not be materially weakened and the wear in use will be taken up by the rolling bearings themselves.

Ball bearings have previously been employed upon drill cutters, but without particular success for the reason that the ball races were not correctly placed and did not properly receive the wear in operation. I contemplate the use of at least three rows of bearings, so placed as to properly receive the thrust upon the bearings due to the cutting operation.

I also have as an object the provision of an effective construction allowing the insertion of the balls into position without difficulty and of then retaining the same in place.

My invention is intended for use particularly upon conical cutters of the interfitting or self cleaning type although obviously it is not confined to this type of cutter.

In the drawing is illustrated a drill with the self cleaning cutters thereon, my bearing being illustrated therewith.

The drill includes a head 1 having a tapered upper threaded shank 2 and downwardly diverging legs 3 thereon. On each of the legs 3 is an inwardly and downwardly projecting shaft 4 upon which the cutters 5 are rotatable. The shank and head have a central water passage 6 therein, through which flushing fluid may be discharged upon the cutters.

There are no bushings upon the shafts 4, but I have provided bearing races therein at points where the thrust due to weight on the drill in use occurs most strongly. The weight of the drill stem upon the drill tends to force said drill directly downward upon the well bottom. As the cutter shafts are inclined toward the bottom, the thrust upon the bearings is not entirely upward, but there is also a strong lateral component tending to slide the cutters upwardly and outwardly along the shafts.

I take up the vertical thrust upon all three sets of bearings, which I employ. These bearings include a row of small balls 7 which engage within a raceway 8 formed where the shaft 4 is stepped down in diameter adjacent its forward end. On the larger diameter of the shaft are two rows of balls 9 and 10, the row 9 being intermediate between the row 7 and the row 10 which is at the base of the shaft. The said row 10 travels in a raceway 11 where the shaft joins the head.

The row of bearings 9 also takes part of the vertical thrust and acts as a retaining means to hold the cutter upon the shaft.

The lateral component of the thrust upon the bearings is received largely by the end race 7 as will be obvious and this row of bearings is in a position between the inner wall of the cutter and the shoulder 12 upon the shaft where it may receive this thrust most effectively. Each of the other rows of bearings acts also to take up a small part of the lateral thrust as will be apparent from the drawing.

In placing the cutter upon the shaft, the row of balls 7 is placed in position in the cutter and held in position by a thick pasty lubricant. The row 10 is set in place on the shaft and also held thereby lubricant, and the cutter is then fitted over the end of the shaft. When this is done the intermediate set of balls 9 are introduced into position by way of a channel or passage 13 bored through the leg 3 and shaft 4 in an approximately horizontal position leading from the outside of the head directly to the race in which the balls are adapted to operate. When the balls 9 have been fed through this passage the said passage is closed by a plug 14, the forward end of which is recessed at 15 to form a part of the ball race in the shaft. This plug may then be anchored firmly by any desired means such as a bond of welding material 16.

As will be apparent, the row of ball bearings 9 serve the double purpose of retaining the cutter upon the shaft and also taking its portion of the bearing thrust. It is also to be noted that the inner surface of the cutter is spaced slightly from the outer surface of the shaft 4 so that the bearings take up all the wear in use. Further there is a space about the bearings to contain lubricant in sufficient amount to prevent material wear particularly as the flushing fluid in the hole can find access to the bearings.

By using three rows of bearings so placed as to take the wear effectively, I not only provide a more durable and effective bearing, but I am able to use balls comparatively small in diameter. In so doing little space is necessary to receive the balls and as a result, the shaft can be made larger and the wall of the cutter thicker than could be done where but one row of bearings of larger diameter is used. The three rows of balls will hold up under wear as long as do the cutting teeth upon the cutter so that cutters and bearings may be replaced or discarded at once.

The use of the three rows of balls placed as shown and described makes the rolling of the cutters upon the shafts smooth and reliable. The cutters will not stick or fail to rotate and the wear both upon teeth and upon the bearings will be uniform. The cutters thus mounted cut faster and last longer than when mounted in the old way. I find that cutters are supported more firmly due to their having bearings in three planes and hence their operation is more uniform, thus reducing wear and liability to breakage.

Further with rolling bearings rather than stationary bearings as in the old cutters, the wear is more evenly distributed and the lubricator can be eliminated. The use of an outboard row of balls 10 right at the base, and an inboard row at 7 enables me to prevent tilting to any objectionable extent, the wear is uniform and smooth operation results, thus obtaining greater service from each set of cutters.

What I claim as new is:

1. A well drill including a head, downwardly diverging legs thereon, inwardly converging shafts on said legs, an approximately conical cutter on each of said shafts, said shafts having raceways for rolling bearings at each end and an intermediate raceway, rolling bearings in said raceways spacing each cutter slightly from its shaft, one of said rows of rolling bearings acting to retain the cutter upon its shaft.

2. A well drill including a head, downwardly diverging legs thereon, inwardly converging shafts on said legs, an approximately conical cutter on each of said shafts, said shafts having raceways for rolling bearings at each end and an intermediate raceway, rolling bearings in said raceways spacing each cutter slightly from its shaft.

3. A well drill including a head, downwardly diverging legs thereon, inwardly converging shafts on said legs, an approximately conical cutter on each of said shafts, said shafts having raceways for rolling bearings at each end and an intermediate raceway, rolling bearings in said raceways spacing each cutter slightly from its shaft, the intermediate row of rolling bearings serving to retain said cutter upon its shaft.

4. A well drill including a head, the lower end of which is forked, downwardly and inwardly inclined cutter shafts on the said forked end, said shafts having bearing raceways at both ends thereof and an intermediate raceway, a toothed cutter fitting over the end of each shaft and having raceways therein registering with those on said shaft, rows of balls in said raceways, there being an approximately horizontal passage through said head and shaft to allow insertion of balls to one of said raceways and means to close said passage.

5. A well drill including a head the lower end of which is forked, downwardly and inwardly inclined cutter shafts on the said forked end, said shafts having bearing raceways at both ends thereof and an intermediate raceway, a toothed cutter fitting over the end of said shaft, rows of balls in said raceways, and means, including one of said rows of balls, to hold said cutter on its shaft, said rows of balls being located on said shafts so as to effectively take up the thrust due to the weight imposed on said drill.

6. A drill head, a downwardly inclined cutter shaft extending integrally therefrom, an outboard anti-friction bearing on said shaft adjacent said head, an inner bearing race to take up the bearing thrust between the ends of said shaft, and means whereby said inner bearings may be inserted into position through said shaft, with said cutter mounted thereon, said inner bearings acting to retain said cutter in position.

7. A roller bit having a head; a bearing having a raceway and a bore leading transversely into said raceway; a cutter to enclose said bearing; said cutter having a raceway; balls; and a plug; said balls being insertible through said bore into said raceways and said plug being insertible into said bore to hold said balls in said raceways when said bearing is on said head and said cutter is on said bearing, to rotatably lock said cutter on said bearing.

8. A roller bit having a head; a bearing on and extending downwardly and at an angle to the longitudinal axis of said head, said bearing having a raceway and a bore leading transversely into the upper portion of said raceway; a cutter to enclose said bearing, said cutter having a raceway; balls; and a plug; said balls being insertible through said bore into said raceways and said plug being insertible into said bore to hold said balls in said raceways when said cutter is on said bearing on said head, to rotatably lock said cutter on said bearing.

FLOYD L. SCOTT.

DISCLAIMER 2,011,084.—*Floyd L. Scott*, Houston, Tex. MOUNTING FOR DRILL CUTTERS. Patent dated August 13, 1935. Disclaimer filed March 7, 1940, by the inventor; the assignee, *Hughes Tool Company*, concurring.

Hereby enters this disclaimer to claims 7 and 8 of said patent.
[*Official Gazette April 2, 1940.*]